(12) United States Patent
Yoon

(10) Patent No.: US 11,275,164 B2
(45) Date of Patent: Mar. 15, 2022

(54) METHOD FOR MEASURING DISTANCE BETWEEN MULTIPLE ELECTRONIC DEVICES, AND ELECTRONIC DEVICE THEREFOR

(71) Applicant: SAMSUNG ELECTRONICS CO., LTD., Suwon-si (KR)

(72) Inventor: Suk Un Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 16/758,942

(22) PCT Filed: Nov. 13, 2018

(86) PCT No.: PCT/KR2018/013756
§ 371 (c)(1),
(2) Date: Apr. 24, 2020

(87) PCT Pub. No.: WO2019/093852
PCT Pub. Date: May 16, 2019

(65) Prior Publication Data
US 2021/0181325 A1 Jun. 17, 2021

(30) Foreign Application Priority Data
Nov. 13, 2017 (KR) .................. 10-2017-0150712

(51) Int. Cl.
*G01S 11/16* (2006.01)
*H04W 4/02* (2018.01)

(52) U.S. Cl.
CPC .............. *G01S 11/16* (2013.01); *H04W 4/023* (2013.01)

(58) Field of Classification Search
CPC .......... G01S 11/16; G01S 11/06; H04W 4/023
See application file for complete search history.

(56) References Cited

U.S. PATENT DOCUMENTS

| 6,680,688 B1 | 1/2004 | Jiang et al. |
| 7,408,839 B2 | 8/2008 | McFarland |

(Continued)

FOREIGN PATENT DOCUMENTS

| EP | 3199974 A1 | 8/2017 |
| KR | 1020100094264 A | 8/2010 |

(Continued)

OTHER PUBLICATIONS

Communication dated Sep. 17, 2020 from the European Patent Office in application No. 18875353.7.

(Continued)

*Primary Examiner* — Chuong A Ngo
(74) *Attorney, Agent, or Firm* — Sughrue Mion, PLLC

(57) ABSTRACT

An electronic apparatus connectable to an external electronic apparatus includes a wireless communicator configured to receive a wireless signal from the external electronic apparatus; a sound wave receiver configured to receive a sound wave signal from the external electronic apparatus; and a controller configured to, based on an initial distance between the external electronic apparatus and the electronic apparatus measured by using the wireless signal and the sound wave signal, measure a propagation constant between the external electronic apparatus and the electronic apparatus, and when the initial distance between the external electronic apparatus and the electronic apparatus is changed to a first distance, measure the first distance based on the propagation constant.

13 Claims, 8 Drawing Sheets

(56) References Cited

U.S. PATENT DOCUMENTS

| | | |
|---|---|---|
| 10,078,135 B1 * | 9/2018 | Almada .................. G01S 11/16 |
| 10,199,237 B2 | 2/2019 | Terasaki et al. |
| 10,591,589 B2 | 3/2020 | Han et al. |
| 2013/0226935 A1 | 8/2013 | Bai et al. |
| 2015/0176988 A1 | 6/2015 | Cho et al. |

FOREIGN PATENT DOCUMENTS

| | | | |
|---|---|---|---|
| KR | 1020140032090 A | 3/2014 | |
| KR | 1020140128381 A | 11/2014 | |
| KR | 101508522 B1 | 4/2015 | |
| KR | 1020150073366 A | 7/2015 | |
| KR | 101561938 B1 | 10/2015 | |
| KR | 1020150133194 A | 11/2015 | |
| KR | 1020160036496 A | 4/2016 | |
| WO | 2014137698 A1 | 9/2014 | |

OTHER PUBLICATIONS

International Search Report (PCT/ISA/210) from the International Searching Authority dated Feb. 21, 2019 in application No. PCT/KR2018/013756.

Written Opinion (PCT/ISA/237) from the International Searching Authority dated Feb. 21, 2019 in application No. PCT/KR2018/013756.

* cited by examiner

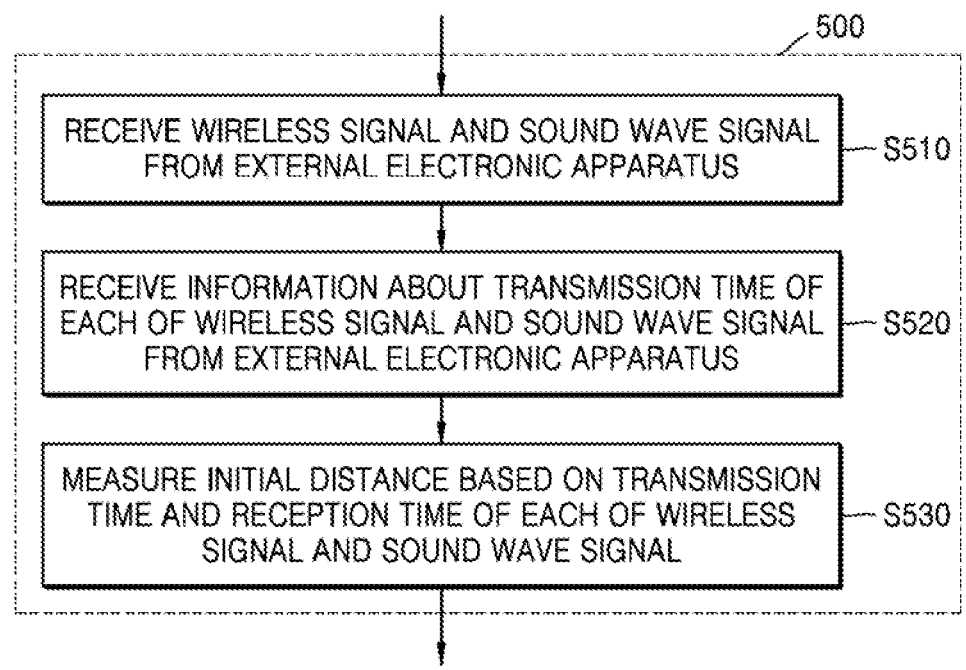
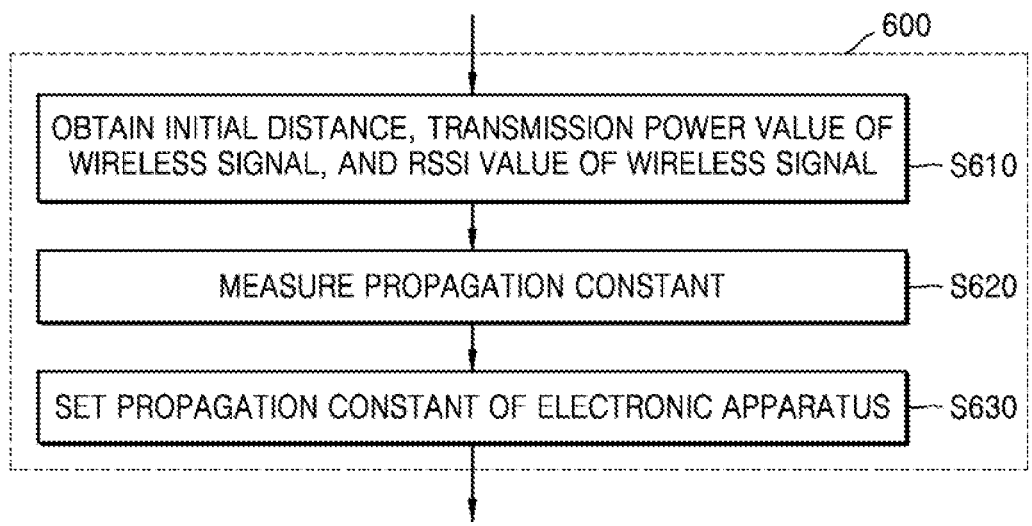

METHOD FOR MEASURING DISTANCE BETWEEN MULTIPLE ELECTRONIC DEVICES, AND ELECTRONIC DEVICE THEREFOR

TECHNICAL FIELD

The disclosure relates to a method of measuring a distance between a plurality of electronic apparatuses and an electronic apparatus according to the method.

More particularly, the disclosure relates to a method of measuring a distance between a plurality of electronic apparatuses that are connectable to one another through a wireless communication network and an electronic apparatus according to the method.

BACKGROUND ART

As portable electronic apparatuses have been widely used, a technology of connecting portable electronic apparatuses and other electronic apparatuses to one another through a wireless communication network to allow the connected electronic apparatuses to be used by interoperating with one another has been developed.

Also, as a plurality of non-portable electronic apparatuses may be controlled by using a Home Internet of Things (IoT) Platform or the like, a technology of connecting a plurality of electronic apparatuses located in a home to one another and using and/or controlling them has been developed.

According to these technologies, a distance between a plurality of electronic apparatuses that are connected to one another through a wireless communication network may be measured, and an operation of connecting or disconnecting wireless communication or maintaining connected communication may be performed based on the measured distance. Alternatively, a distance between a plurality of electronic apparatuses that are connected to one another through a wireless communication network may be measured, and an operation between the plurality of electronic apparatuses may be controlled based on the measured distance. Alternatively, a distance between a plurality of electronic apparatuses that are connected to one another through a wireless communication network may be measured, and the setting of a communication network formed between the plurality of electronic apparatuses may be changed based on the measured distance.

In order to perform the above operations, a distance between a plurality of electronic apparatuses that are connected to one another has to be accurately measured or estimated first.

DESCRIPTION OF EMBODIMENTS

Technical Problem

Provided are a method of measuring a distance and an electronic apparatus according to the method which may accurately measure a distance between a plurality of electronic apparatuses that are connectable to one another through a wireless communication network.

Provided are a method of measuring a distance and an electronic apparatus according to the method which may accurately measure a distance between a plurality of electronic apparatuses that are connectable to one another through a wireless communication network by using a propagation constant.

Provided are a method of measuring a distance and an electronic apparatus according to the method which, once a propagation constant is measured one time, even when a distance between a plurality of electronic apparatuses is changed subsequently, may rapidly and accurately measure the changed distance.

Solution to Problem

In order to accurately measure or predict a distance between a plurality of electronic apparatus that are connectable to one another, in accordance with an aspect of the disclosure, an electronic apparatus connectable to an external electronic apparatus includes: a wireless communicator configured to receive a wireless signal from the external electronic apparatus; a sound wave receiver configured to receive a sound wave signal from the external electronic apparatus; and a controller configured to, based on an initial distance between the external electronic apparatus and the electronic apparatus measured by using the wireless signal and the sound wave signal, measure a propagation constant between the external electronic apparatus and the electronic apparatus, and a distance between the external electronic apparatus and the electronic apparatus is changed to a first distance, measure the first distance based on the propagation constant.

Advantageous Effects of Disclosure

A method of measuring a distance between a plurality of electronic apparatuses and an electronic apparatus according to the method according to one or more embodiments may accurately measure a distance between a plurality of electronic apparatuses that are connectable to one another through a wireless communication network.

Once a propagation constant is measured one time, even when a distance between a plurality of electronic apparatuses is changed subsequently, a method of measuring a distance between a plurality of electronic apparatuses and an electronic apparatus according to the method according to the one or more embodiments may rapidly and accurately measure the changed distance

BRIEF DESCRIPTION OF DRAWINGS

FIG. 5 is a flowchart of an operation of measuring an initial distance, according to an embodiment.

FIG. 6 is a flowchart of an operation of setting a propagation constant, according to an embodiment.

BEST MODE

Figure 1:
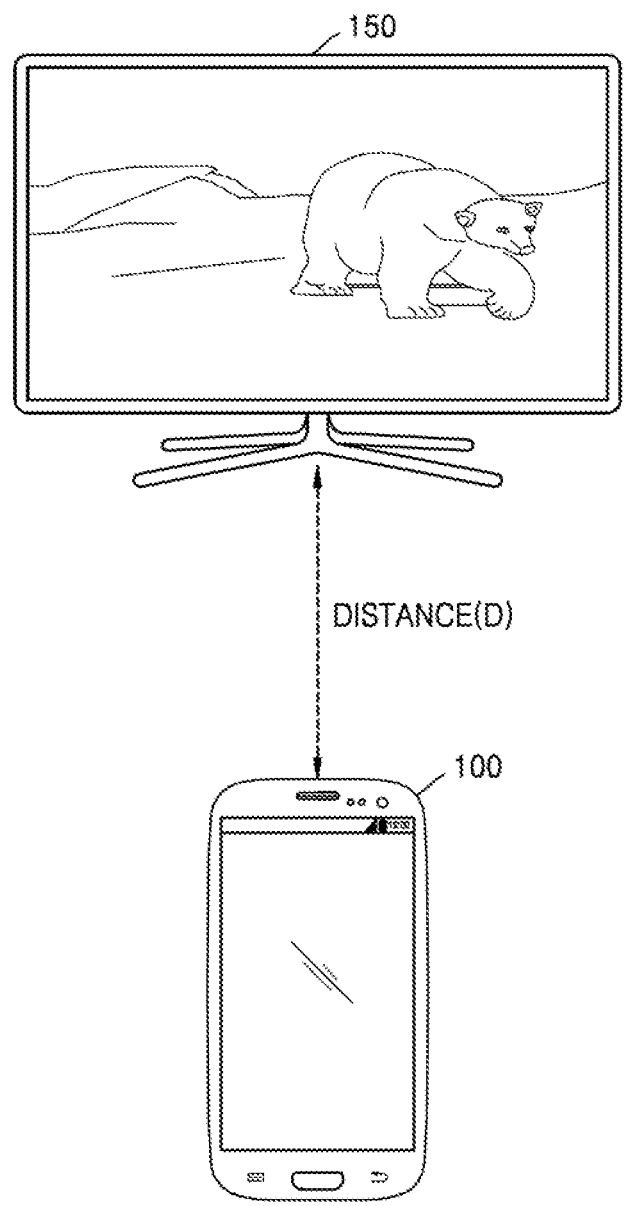
FIG. 1 is a view illustrating a plurality of electronic apparatuses connectable to one another through a wireless communication network.

In accordance with an aspect of the disclosure, an electronic apparatus connectable to an external electronic apparatus includes: a wireless communicator configured to receive a wireless signal from the external electronic apparatus; a sound wave receiver configured to receive a sound wave signal from the external electronic apparatus; and a controller configured to, based on an initial distance between the external electronic apparatus and the electronic apparatus measured by using the wireless signal and the sound wave signal, measure a propagation constant between the external electronic apparatus and the electronic apparatus, and a distance between the external electronic apparatus and the electronic apparatus is changed to a first distance, measure the first distance based on the propagation constant.

The controller may be further configured to measure the propagation constant based on the initial distance, a transmission power value of the wireless signal, and a value corresponding to a received signal strength of the wireless signal.

The controller may be further configured to, a distance between the external electronic apparatus and the electronic apparatus is changed to the first distance, measure the first distance based on the propagation constant, a transmission power value of the wireless signal, and a value corresponding to a received signal strength of the wireless signal.

The wireless signal may be a Bluetooth low energy (BLE) signal, the sound wave signal may be an ultrasound signal, and the value corresponding to the received signal strength may be a received signal strength indicator (RSSI) of the BLE signal.

The electronic apparatus may further include a display configured to output a user interface screen including at least one of information about the measured first distance and the external electronic apparatus spaced apart by the first distance from the electronic apparatus.

The controller may be further configured to measure the initial distance based on a transmission time and a reception time of each of the wireless signal and the sound wave signal.

The wireless communicator may be further configured to receive information about the transmission time of each of the wireless signal and the sound wave signal, from the external electronic apparatus, and the controller may be further configured to measure the initial distance, based on the received information about the transmission time and the reception time of each of the wireless signal and the sound wave signal.

The wireless communicator may include a BLE communication module configured to receive the wireless signal that is a BLE signal, and the sound wave receiver may include a microphone configured to receive the wireless signal that is an ultrasound signal.

In accordance with another aspect of the disclosure, an electronic apparatus connectable to an external electronic apparatus includes: a sound wave transmitter configured to transmit a sound wave signal to the external electronic apparatus; a wireless communicator configured to transmit a wireless signal to the external electronic apparatus, and receive information about a reception time of the wireless signal and a reception time of the sound wave signal from the external electronic apparatus; and a controller configured to measure a propagation constant between the external electronic apparatus and the electronic apparatus based on an initial distance between the external electronic apparatus and the electronic apparatus, and a distance between the external electronic apparatus and the electronic apparatus is changed to a first distance, measure the first distance based on the propagation constant.

The controller may be further configured to measure the initial distance based on a transmission time and the reception time of each of the wireless signal and the sound wave signal, which are received from the external electronic apparatus.

In accordance with another aspect of the disclosure, a method of measuring a distance includes: receiving a wireless signal and a sound wave signal from an external electronic apparatus; measuring a propagation constant between an external electronic apparatus and the electronic apparatus based on an initial distance between the external electronic apparatus and the electronic apparatus measured by using the wireless signal and the sound wave signal; and a distance between the external electronic apparatus and the electronic apparatus is changed to a first distance, measuring the first distance based on the propagation constant.

The measuring of the propagation constant may include measuring the propagation constant based on the initial distance, a transmission power value of the wireless signal, and a value corresponding to a received signal strength of the wireless signal.

The measuring of the first distance may include, a distance between the external electronic apparatus and the electronic apparatus is changed to the first distance, measuring the first distance based on the propagation constant, a transmission power value of the wireless signal, and a value corresponding to a received signal strength of the wireless signal.

The wireless signal may be a Bluetooth low energy (BLE) signal, the sound wave signal may be an ultrasound signal, and the value corresponding to the received signal strength may be a received signal strength indicator (RSSI) of the BLE signal.

The method may further include outputting a user interface screen including at least one of information about the measured first distance and the external electronic apparatus spaced apart by the first distance from the electronic apparatus.

The method may further include measuring the initial distance based on a transmission time and a reception time of each of the wireless signal and the sound wave signal.

The measuring of the initial distance may include: receiving information about the transmission time of each of the wireless signal and the sound wave signal from the external electronic apparatus, through a wireless communicator of the electronic apparatus; and measuring the initial distance, based on the received information about the transmission time, and the reception time of each of the wireless signal and the sound wave signal.

In accordance with another aspect of the disclosure, a non-transitory recording medium has embodied thereon a program including computer-executable instructions for executing a method including: receiving a wireless signal and a sound wave signal from an external electronic apparatus; measuring a propagation constant between the external electronic apparatus and an electronic apparatus based on an initial distance between the external electronic apparatus and the electronic apparatus; and a distance between the external electronic apparatus and the electronic apparatus is changed to a first distance, measuring the first distance based on the propagation constant.

MODE OF DISCLOSURE

Hereinafter, the present disclosure will be described in detail with reference to the accompanying drawings in order to enable one of ordinary skill in the art to easily embody and practice the present disclosure. However, the present disclosure is not limited to examples disclosed below, but may be implemented in various forms. Also, parts in the drawings unrelated to the detailed description are omitted to ensure clarity of the present disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The phrases "in some embodiments" or "in an embodiment" throughout the specification do not necessarily all refer to the same embodiment.

The present disclosure may be described in terms of functional block components and various processing steps. Some or all of such functional blocks may be realized by any number of hardware and/or software components configured to perform specified functions. For example, the functional blocks of the present disclosure may be realized by one or more processors or microprocessors or circuit components for performing predetermined functions. Also, the functional blocks may be implemented with various programming or scripting languages. The functional blocks may be implemented in algorithms executed on one or more processors. Also, the present disclosure could employ any number of conventional techniques for electronics configuration, signal processing, and/or data processing. The term "module" or "configuration" may be used broadly and is not limited to mechanical and physical embodiments.

Furthermore, connecting lines, or connectors shown in the various drawings are intended to represent exemplary functional relationships and/or physical or logical couplings between various elements. It should be noted that many alternative or additional functional relationships, physical connections, or logical connections may be present in a practical device.

The present disclosure will now be described more fully with reference to the accompanying drawings, in which embodiments are shown.

FIG. 1 is a view illustrating a plurality of electronic apparatuses that are connectable to one another through a wireless communication network.

An electronic apparatus according to an embodiment may be any electronic apparatus connectable to another electronic apparatus through a wireless communication network.

In detail, the electronic apparatus according to an embodiment may be any electronic apparatus that may transmit/receive predetermined data to/from at least one adjacent electronic apparatus, may be paired with at least one adjacent electronic apparatus, may remotely control at least one adjacent electronic apparatus, or may be remotely controlled by at least one adjacent electronic apparatus.

For example, the electronic apparatus according to an embodiment may be a mobile computing device such as, but not limited to, a wearable device, a smartphone, a tablet personal computer (PC), a PC, a personal digital assistant (PDA), a laptop computer, a media player, a micro-server, a global positioning system (GPS), an electronic book terminal, a digital broadcast terminal, a navigation system, a kiosk, a MP3 player, a digital camera, an electronic control device of a vehicle, or a central information display (CID), or a non-mobile computing device. That is, the electronic apparatus according to an embodiment may be any type of electronic apparatus that is portable by a user, or may be an electronic apparatus that is not portable by the user.

Also, the electronic apparatus according to an embodiment may be a home appliance that is controllable by a Home Internet of Things (IoT) platform, such as a TV, a washing machine, a refrigerator, a microwave oven, or a computer at home.

In FIG. 1, the electronic apparatus according to an embodiment is a smartphone 100 or a display apparatus 150 such as a TV. In detail, the following will be described on the assumption that the electronic apparatus according to an embodiment is the smartphone 100, and at least another electronic apparatus connectable to the smartphone 100 through a wireless communication network is the display apparatus 150.

Hereinafter, at least one electronic apparatus connected through a wireless communication network to the electronic apparatus according to an embodiment is referred to as an 'external electronic apparatus'. Also, the electronic apparatus and the external electronic apparatus are relative terms and may be interchangeably used according to which apparatus from among a plurality of electronic apparatus that are operable by being paired with one another is a reference apparatus.

The smartphone 100 may be connected through a wireless communication network to the display apparatus 150. For example, the wireless communication network may be a communication network according to a Bluetooth communication standard. In more detail, the Bluetooth communication standard may be a Bluetooth low energy (BLE) communication network. The following will be described on the assumption that the electronic apparatus according to an embodiment and another electronic apparatus according to an embodiment are connected to each other through a BLE communication network.

Referring to FIG. 1, it may be necessary to measure a distance D between the smartphone 100 that is an electronic apparatus and the display apparatus 150 that is an external electronic apparatus according to an embodiment. For example, when the smartphone 100 recognizes at least one adjacent external apparatus and performs an operation of connecting or disconnecting wireless communication or maintaining connected communication based on a distance to the external electronic apparatus, the distance D has to be measured.

Alternatively, when an operation of at least one of the smartphone 100 and the display apparatus 150 needs to be controlled based on a distance between the smartphone 100 and at least one adjacent external electronic apparatus, the distance D has to be measured. In detail, when the smartphone 100 is located adjacent to the display apparatus 150 and a distance between the smartphone 100 and the display apparatus 150 is equal to or less than a predetermined distance, the smartphone 100 may perform screen mirroring on the display apparatus 150. That is, when the distance D between the smartphone 100 and the display apparatus 150 is measured and the measured distance D is equal to or less than the predetermined distance, the smartphone 100 may transmit image data to be mirrored to the display apparatus 150 and may control the display apparatus 150 to output a screen of the smartphone 100.

Alternatively, when the smartphone 100 is continuously moved and a plurality of display apparatuses are located in a path of the smartphone 100, the smartphone 100 may measure distances D and may perform screen mirroring on a display apparatus (e.g., the display apparatus 150) having a smallest distance D.

Alternatively, when the smartphone 100 is continuously moved and a plurality of speakers are located in a path of the smartphone 100, the smartphone 100 may measure distances D to the plurality of speakers and may control music to be output through a speaker having a smallest distance D.

A detailed configuration and operation of the electronic apparatus according to an embodiment, for example, the smartphone 100 or the display apparatus 150, will now be described in detail with reference to FIGS. 2 through 9.

Figure 2:
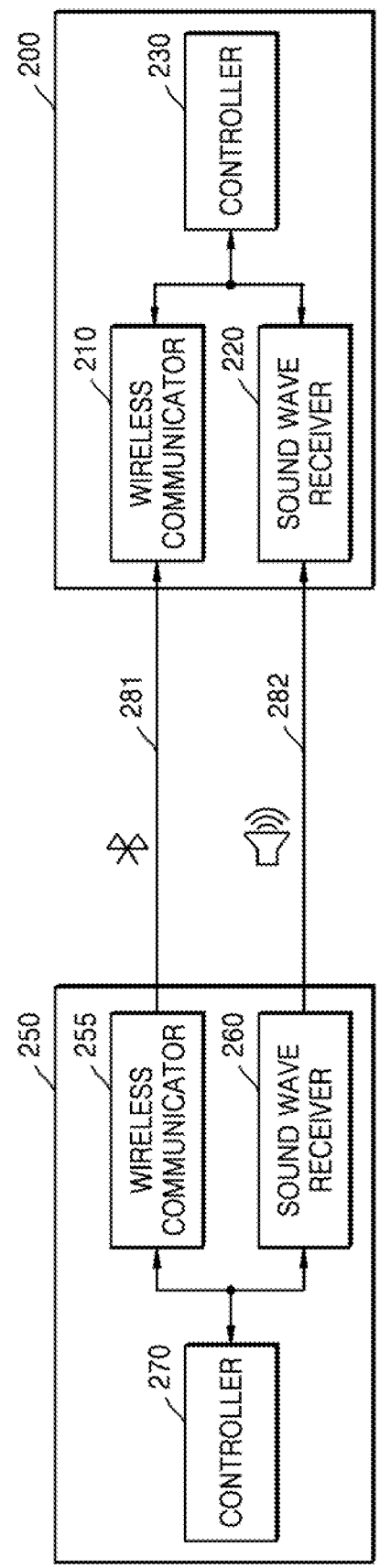
FIG. 2 is a block diagram of an electronic apparatus according to an embodiment.

FIG. 2 is a block diagram of an electronic apparatus 200 according to an embodiment.

Referring to FIG. 2, the electronic apparatus 200 according to an embodiment is an electronic apparatus connectable to an external electronic apparatus 250. In detail, the electronic apparatus 200 is an electronic apparatus connectable through a wireless communication network to the external electronic apparatus 250.

The electronic apparatus 200 of FIG. 2 corresponds to the smartphone 100 or the display apparatus 150 that is an electronic apparatus of FIG. 1, and thus a repeated explanation thereof will not be given.

The external electronic apparatus 250 refers to another electronic apparatus independent from the electronic apparatus 200 according to an embodiment, and may be the same or different type of electronic apparatus as or from the electronic apparatus 200. For example, the external electronic apparatus 250 may be a mobile computing device such as, but not limited to, a wearable device, a smartphone, a tablet PC, a PC, a PDA, a laptop computer, a media player, a micro-server, a GPS, an electronic book terminal, a digital broadcast terminal, a navigation system, a kiosk, an MP3 player, a digital camera, an electronic control device of a vehicle, or a CID, or a non-mobile computing device. Also, the external electronic apparatus 250 may be a display apparatus such as a TV, a washing machine, a refrigerator, a microwave oven, or a computer.

Referring to FIG. 2, the electronic apparatus 200 includes a wireless communicator 210, a sound wave receiver 220, and a controller 230.

The wireless communicator 210 receives a wireless signal from the external electronic apparatus 250. The wireless signal is a signal generated and transmitted according to a wireless communication standard. Also, the wireless communication standard may be a wireless local area network (LAN) such as WiFi, Bluetooth, Zigbee, WiFi-Direct (WFD), ultra-wideband (UWB), infrared data association (IrDA), BLE, or near-field communication (NFC). Accordingly, the wireless signal according to an embodiment may be a WiFi signal, a Bluetooth signal, a Zigbee signal, a WFD signal, a UWB signal, an IrDA signal, a BLE signal, or an NFC signal.

Also, the wireless communicator 210 may include at least one wireless communication module (not shown) that transmits/receives a wireless signal according to at least one wireless communication standard.

For example, the wireless communicator 210 may include a BLE communication module (not shown) that transmits/receives a BLE signal 281 according to a BLE communication standard.

In FIG. 2, a wireless signal received by the wireless communicator 210 is the BLE signal 281. Also, the following will be described on the assumption that the wireless signal according to an embodiment is the BLE signal 281.

The sound wave receiver 220 receives a sound wave signal 282 from the external electronic apparatus 250. The sound wave signal 282 may include an ultrasound signal. Also, the sound wave receiver 220 may include a reception module for receiving the sound wave signal 282. In detail, the sound wave receiver 220 may include a microphone. For example, an ultrasound signal may be received through a microphone (not shown). Also, the sound wave receiver 220 may include a plurality of microphones that are spaced apart from one another, and may receive the sound wave signal 282 through at least one of the plurality of microphones. Also, the sound wave receiver 220 may include a microphone array, and may receive the sound wave signal 282 through the microphone array.

The controller 230 measures a propagation constant between the external electronic apparatus 250 and the electronic apparatus 200, based on an initial distance between the external electronic apparatus 250 and the electronic apparatus 200 measured by using a wireless signal and a sound wave signal. A distance between the external electronic apparatus 250 and the electronic apparatus 200 is changed to a first distance, the controller 230 measures the first distance based on the propagation constant.

The initial distance refers to a distance between the external electronic apparatus 250 and the electronic apparatus 200 measured by using a wireless signal received by the wireless communicator 210 and a sound wave signal received by the sound wave receiver 220. In detail, the controller 230 may measure the initial distance by using a wireless signal received by the wireless communicator 210 and a sound wave signal received by the sound wave receiver 220. Also, the wireless signal and the sound wave signal may be received at the same time or at similar times.

When the initial distance is measured by using an ultrasound signal that is a sound wave with a frequency higher than the upper audible limit of human hearing, the initial distance may be measured without a user's inconvenience due to generation of an audible sound.

Also, the external electronic apparatus 250 may output a wireless signal and a sound wave signal to the electronic apparatus 200 at the same time.

The external electronic apparatus 250 may include a wireless communicator 255, a sound wave transmitter 260, and a controller 270. The wireless communicator 255 may correspond to the wireless communicator 210, and thus a detailed explanation thereof will not be given. The sound wave transmitter 260 may include a sound output device (not shown) that outputs a sound wave signal. For example, the sound output device included in the sound wave transmitter 260 may include at least one speaker (not shown). In detail, at least one speaker may output an ultrasound signal. The controller 270 may control the wireless communicator 255 and the sound wave transmitter 260 to respectively output a wireless signal and a sound wave signal. Also, the controller 270 may control information about a transmission time of each of the wireless signal and the sound wave signal to be transmitted to the electronic apparatus 200 through the wireless communicator 255.

Since a transmission speed of the wireless signal is higher than a transmission speed of the sound wave signal, even when the external electronic apparatus 250 outputs the wireless signal and the sound wave signal at the same time to the electronic apparatus 200, a time at which the wireless communicator 210 receives the wireless signal may be earlier than a time at which the sound wave receiver 220 receives the sound wave signal. In the above example, the time at which the sound wave signal is received may be later than but close to the time at which the wireless signal is received.

An operation of obtaining an initial distance according to an embodiment will be described below in detail with reference to FIGS. 4 and 5.

Also, the controller 230 may measure a propagation constant based on an initial distance, a transmission power value of a wireless signal, and a value corresponding to a received signal strength of the wireless signal. An operation of measuring the propagation constant based on the initial distance according to an embodiment will be described below in detail with reference to FIG. 6.

Also, an operation of measuring the first distance according to an embodiment will be described below in detail with reference to FIG. 7.

Also, the external electronic apparatus 250 may perform an operation of measuring an initial distance, measuring a propagation constant, and measuring a first distance. In detail, the external electronic apparatus 250 may include the sound wave transmitter 260 configured to transmit a sound wave signal to the electronic apparatus 200, the wireless communicator 255 configured to transmit a wireless signal and receive information about a reception time of the wireless signal and a reception time of the sound wave signal from the electronic apparatus 200, and the controller 270 configured to measure a propagation constant between the external electronic apparatus 250 and the electronic apparatus 200 based on an initial distance between the external electronic apparatus 250 and the electronic apparatus 200 and, a distance between the external electronic apparatus 250 and the electronic apparatus 200 is changed to a first distance, measure the first distance based on the propagation constant.

An operation of measuring the initial distance, measuring the propagation constant, and measuring the first distance which may be performed by the external electronic apparatus 250 is the same as an operation of measuring an initial distance, measuring a propagation constant, and measuring a first distance which may be performed by the electronic apparatus 200, and thus a repeated explanation thereof will not be given.

Figure 3:
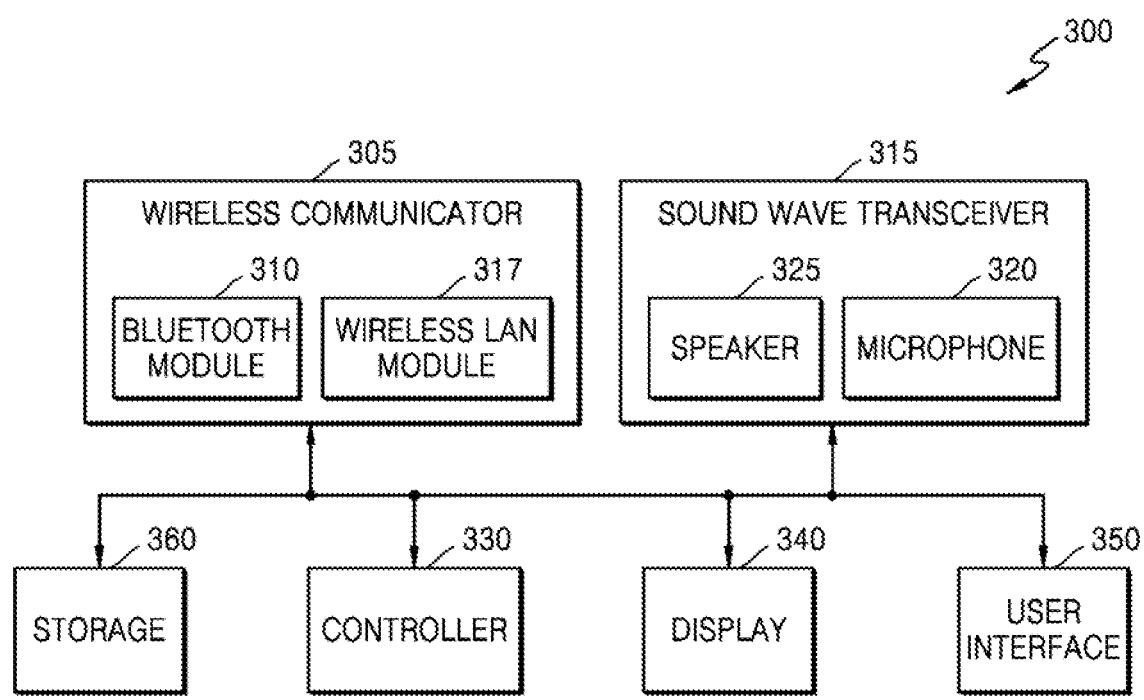
FIG. 3 is a detailed block diagram of an electronic apparatus according to an embodiment.

FIG. 3 is a detailed block diagram of an electronic apparatus 300 according to an embodiment. The electronic apparatus 300 of FIG. 3 which is a detailed example of the electronic apparatus 200 of FIG. 2 corresponds to the electronic apparatus 200. Accordingly, when the electronic apparatus 300 is described, the same description as that made for the electronic apparatus 200 of FIG. 2 will not be repeatedly given. In detail, a wireless communicator 305, a microphone 320, and a controller 330 included in the electronic apparatus 300 may respectively correspond to the wireless communicator 210, the sound wave receiver 220, and the controller 230 included in the electronic apparatus 200.

Referring to FIG. 3, the electronic apparatus 30 may further include at least one of a display 340, a user interface 350, and a storage 360, when compared to the electronic apparatus 200. Also, the electronic apparatus 300 may include a sound wave transceiver 315 for transmitting/receiving a sound wave signal. The sound wave transceiver 315 may include a speaker 325 and the microphone 320. Although the speaker 325 and the microphone 320 are included in the sound wave transceiver 315 in FIG. 3, the speaker 325 and the microphone 320 may be physically separately formed.

Also, although the electronic apparatus 300 includes one speaker 325 and one microphone 320 in FIG. 3, the electronic apparatus 300 may include at least one speaker 325 and at least one microphone 320.

The wireless communicator 305 may include at least one wireless communication module for transmitting/receiving a wireless signal according to at least one wireless communication standard. As described with reference to FIG. 2, the wireless communication module may be a communication module for generating, transmitting, or receiving the wireless signal according to a predetermined wireless communication standard, and may be implemented as any of various types according to various wireless communication standards.

The wireless communicator 305 may include a Bluetooth module 310. The Bluetooth module 310 receives a Bluetooth signal transmitted by the external electronic apparatus 250 according to a Bluetooth communication standard. The Bluetooth module 310 may be a BLE module, and may receive a BLE signal.

Also, the wireless communicator 305 may further include a wireless LAN module 317. The wireless LAN module 317 may receive a WiFi signal transmitted by the external electronic apparatus 250 according to a WiFi communication standard.

Also, the wireless communicator 305 may further include at least one wireless communication module for transmitting/receiving different types of wireless signals in addition to the Bluetooth module 310 and the wireless LAN module 317.

The following will be described on the assumption that the wireless communicator 305 receives a BLE signal through the Bluetooth module 310.

The controller 330 measures a propagation constant between the external electronic apparatus 250 and the electronic apparatus 300 based on an initial distance between the external electronic apparatus 250 and the electronic apparatus 300 measured by using a wireless signal and a sound wave signal. A distance between the external electronic apparatus 250 and the electronic apparatus 300 is changed to a first distance, the controller 330 measures the first distance based on the propagation constant.

In detail, when the microphone 320 receives an ultrasound signal output by the external electronic apparatus 250 and the Bluetooth module 310 receives a BLE signal output by the external electronic apparatus 250, the controller 330 may measure a propagation constant of the external electronic apparatus 250 based on an initial distance measured by using the received ultrasound signal and the received BLE signal.

In detail, the controller 330 may measure a propagation constant based on an initial distance, a transmission power value of a BLE signal, and a value corresponding to a received signal strength of the BLE signal, for example, a received signal strength indicator (RSSI) value. Also, the propagation constant may have a different value according to each external electronic apparatus, and may be measured to correspond to the external electronic apparatus. For example, when an external electronic apparatus that is paired with the electronic apparatus 300 is a TV, the electronic apparatus 300 may obtain an initial distance and a propagation constant between the electronic apparatus 300 and the TV. Alternatively, when an external electronic apparatus that is paired with the electronic apparatus 300 is an audio apparatus, the electronic apparatus 30 may obtain an initial distance and a propagation constant between the electronic apparatus 300 and the audio apparatus.

Also, an initial distance and a propagation constant may be updated in each predetermined cycle. Also, the electronic apparatus 300 may update an initial distance and a propagation constant whenever the identity of an external electronic apparatus to be paired is changed. When the identity of the external electronic apparatus is changed, it may mean that a type of the external electronic apparatus and a product model is changed and a propagation constant between the external electronic apparatus and the electronic apparatus 300 is changed.

Also, when a distance between the external electronic apparatus 250 and the electronic apparatus 300 is changed to a first distance, the controller 330 may measure the first distance based on a propagation constant, a transmission power value of a wireless signal received through the wireless communicator 305, and a value corresponding to a received signal strength of the wireless signal received through the wireless communicator 305.

In detail, when a distance between the external electronic apparatus 250 and the electronic apparatus 300 is changed to a first distance, the controller 330 may measure the first distance based on a propagation constant, a transmission power value of a received BLE signal, and an RSSI value of the received BLE signal.

Also, the controller 330 may include at least one processor. Each of at least one processor may perform a predetermined operation by executing at least one instruction. Also, the controller 330 may control a predetermined operation to be performed by controlling at least one from among at least one processor located inside the controller 330 and at least one processor (not shown) located outside the controller 330.

The display 340 outputs a video signal such as a screen on which the user may visually recognize predetermined information.

In an embodiment, the display 340 may output a user interface screen including at least one of information about a first distance that is measured and the external electronic apparatus 250 spaced apart by the first distance from the electronic apparatus 300.

Also, in an embodiment, the display 340 may output a user interface screen showing at least one external apparatus detected by using a wireless signal.

Also, in an embodiment, the display 340 may output a user interface screen showing information about an initial distance that is measured.

Also, in an embodiment, the display 340 may output a user interface screen showing a process of performing an operation of measuring a first distance.

The user interface 350 may receive a user input for controlling the electronic apparatus 300. The user interface 350 may include a user input device such as, but not limited to, a touchpanel for detecting a user's touch, a button for receiving the user's push, a wheel for receiving the user's rotation, a keyboard, or a dome switch.

In an embodiment, the user interface 350 may receive a user input for requesting to measure an initial distance. The controller 330 may perform an operation of measuring the initial distance in response to the received user input.

Also, in an embodiment, the user interface 350 may receive a user input for requesting to measure a first distance. The controller 330 may perform an operation of measuring the first distance in response to the received user input. Alternatively, the user interface 350 may receive a user input for requesting to measure or update at least one of an initial distance and a propagation constant. The controller 330 may perform an operation corresponding to the received user input.

The storage 360 may include at least one of programs including instructions for performing a predetermined operation, and predetermined data.

In detail, the storage 360 may include at least one type of storage medium from among a flash memory type memory, a hard disk type memory, a multimedia card micro type memory, a card-type memory (e.g., a secure digital (SD) or extreme digital (XD) memory), a random-access memory (RAM), a static random-access memory (SRAM), a read-only memory (ROM), an electrically erasable programmable read-only memory (EPPROM), a programmable read-only memory (PROM), a magnetic memory, a magnetic disk, and an optical disk.

In an embodiment, the storage 360 may store at least one program including instructions for performing the above operations. Alternatively, the storage 360 may store at least one processor for executing a program including instructions for performing the above operations.

Also, the storage 360 may store measured pieces of information. Also, the storage 360 may store a history of changes in the measured pieces of information. In detail, the storage 360 may store an initial distance, a propagation constant, and a first distance according to each external electronic apparatus 250.

An RSS I-based distance measurement technique is widely used as a method of measuring or estimating a distance between electronic apparatuses. Also, a radio frequency (RF) signal-based distance measurement technique may be used. However, an RSSI may vary even at the same distance according to an environment due to RF characteristics, thereby increasing the risk of an error in an estimated distance. For example, even at the same distance to a TV, an RSSI deviation is likely to occur according to a position of a Bluetooth module in the TV and a material of a back cover of the TV.

In an embodiment, for the purpose of overcoming the problem that the risk of an error in an estimated distance may increase in the above methods, both a sound wave signal and a wireless signal may be used to accurately measure a distance between electronic apparatuses. Also, an ultrasound signal may be used as the sound wave signal to measure a distance between electronic apparatuses while minimizing user inconvenience due to generation of an audible sound.

According to an embodiment, an operation and a method for accurately measuring an initial distance between two electronic apparatuses, for example, an electronic apparatus 400 and an external electronic apparatus 450, will now be described in detail with reference to FIG. 4.

Figure 4:
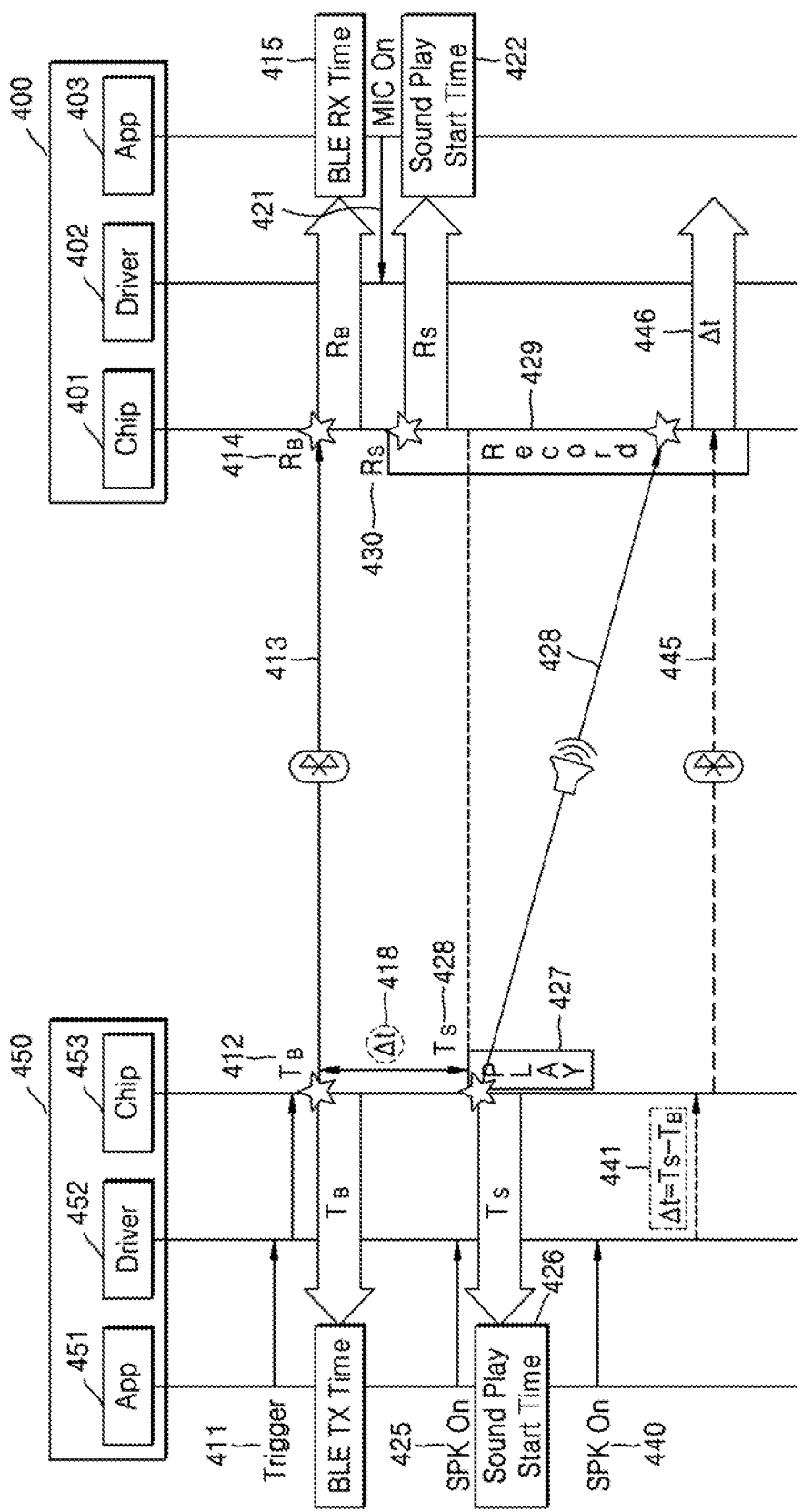
FIG. 4 is a diagram for describing an operation of transmitting/receiving a wireless signal and a sound wave signal, according to an embodiment.

FIG. 4 is a diagram for describing an operation of transmitting/receiving a wireless signal and a sound wave signal, according to an embodiment. As described above, the wireless signal may be a BLE signal, and the sound wave signal may be an ultrasound signal.

Also, since the electronic apparatus 400 of FIG. 4 may correspond to any of the electronic apparatuses 200 and 300 of FIGS. 2 and 3, the same description as that made with reference to FIGS. 2 and 3 will not be repeatedly given. Also, since the external electronic apparatus 450 of FIG. 4 may correspond to the external electronic apparatus 250 of FIG. 2, the same description as that made with reference to FIG. 2 will not be repeatedly given.

Also, in FIG. 4, the external electronic apparatus 450 may perform an operation of transmitting a BLE signal and an ultrasound signal through an embedded system including both software and hardware. Accordingly, an application 451, a driver 452, and a chip 453 constituting the embedded system are included in the external electronic apparatus 450. The application 451 and the driver 452 may correspond to a processor or a microprocessor executed under the control of the controller 270, and the chip 453 may correspond to the wireless communicator 255 and the sound wave transmitter 260 that are output ends operating under the control of the controller 270.

Also, in FIG. 4, the electronic apparatus 400 may perform an operation of receiving a BLE signal and an ultrasound signal through an embedded system including both software and hardware, like the external electronic apparatus 450. Accordingly, an application 403, a driver 402, and a chip 401 may respectively correspond to the application 451, the driver 452, and the chip 453.

Referring to FIG. 4, the external electronic apparatus 450 executes the application 451 for transmitting a BLE signal and an ultrasound signal under the control of the controller 270. The application 451 may generate a trigger signal 411 for requesting to generate the BLE signal under the control of the controller 270. Next, the driver 452 of the external electronic apparatus 400 drives a BLE signal 413 in response to the trigger signal 411. The chip 453 outputs the BLE signal 413 driven by the driver 452 to the electronic apparatus 400. In this case, the application 451 may obtain 'BLE TX Time' that is information about a BLE transmission time $T_B$ 412 that is a time at which the BLE signal 413 is transmitted to the electronic apparatus 400.

Also, in the external electronic apparatus 450, the application 451 causes a signal SPK On 425 for turning on a speaker (not shown) for outputting an ultrasound signal 428 included in the sound wave transmitter 260 to be generated and transmitted to the driver 452. The driver 452 drives the speaker, and the speaker that is in the chip 453 reproduces the ultrasound signal 428 (in operation 427). Accordingly, the ultrasound signal 428 is output to the electronic apparatus 400. In this case, the application 451 may obtain 'Sound Play Start Time' that is information about an ultrasound transmission time $T_S$ that is a time at which the ultrasound signal 428 is transmitted to the electronic apparatus 400.

Δt 418 that is a difference value between the ultrasound transmission time $T_S$ and the BLE transmission time $T_B$ may be represented as $\Delta t = T_S - T_B$ 441. Also, Δt 418 may denote an absolute value of the difference value between the ultrasound transmission time $T_S$ and the BLE transmission time $T_B$.

The external electronic apparatus 450 may transmit, to the electronic apparatus 400, information indicating the difference value between the ultrasound transmission time $T_S$ and the BLE transmission time $T_B$ through a Bluetooth communication module (not shown) of the wireless communicator 255. In detail, the external electronic apparatus 450 may transmit, to the electronic apparatus 400, information indicating the difference value (e.g., Δt 418) between the ultrasound transmission time $T_S$ and the BLE transmission time $T_B$ through a transmitted BLE channel transmitting the BLE signal 413 and an additional BLE channel (in operation 445).

The electronic apparatus 400 receives the BLE signal 413 and the ultrasound signal 428 transmitted by the external electronic apparatus 450. In detail, the Bluetooth module 310 of the electronic apparatus 400 receives the BLE signal 413, and the microphone 320 receives the ultrasound signal 428.

Referring to FIG. 4, the Bluetooth module 310 that is in the chip 401 receives the BLE signal 413 and transmits the BLE signal 413 to the application 403. A time at which the electronic apparatus 400 receives the BLE signal 413 is a BLE reception time $R_B$ 414. The application 403 may obtain 'BLE RX Time' 415 that is information about the BLE reception time $R_B$ 414.

The electronic apparatus 400 may turn on a microphone to receive the ultrasound signal 428 output by the external electronic apparatus 450. Accordingly, since the microphone is turned on, the microphone that is in the chip 401 may receive and record the ultrasound signal 428 (in operation 429). A time at which the electronic apparatus 400 receives the ultrasound signal 428 is an ultrasound reception time $R_S$ 430. The application 403 may obtain 'Sound Play Start Time' 422 that is information about the ultrasound reception time $R_S$ 430. When the controller 330 receives the ultrasound signal 428, the controller 330 may control the microphone to be turned off.

Also, the electronic apparatus 400 may continuously output the BLE signal 413 and the ultrasound signal 428 at the same time or at similar times.

Also, the electronic apparatus 400 may receive the difference value Δt 418 between the ultrasound transmission time $T_S$ and the BLE transmission time $T_B$ (in operation 445), and may transmit the difference value Δt 418 to the controller 330 (in operation 446).

Alternatively, the electronic apparatus 400 may receive information about each of the ultrasound transmission time $T_S$ and the BLE transmission time $T_B$ from the external electronic apparatus 450, and may directly calculate the difference value Δt 418 between the ultrasound transmission time $T_S$ and the BLE transmission time $T_B$ by using the received ultrasound transmission time $T_S$ and the received BLE transmission time $T_B$.

As described above, the electronic apparatus 400 may receive the BLE signal 413 and the ultrasound signal 428 output by the external electronic apparatus 450, and may obtain an initial distance by using the received BLE signal 413 and the received ultrasound signal 428.

The initial distance may be calculated by using [Equation 1].

$$D \approx V_S \times (R_S - R_B - \Delta t) \quad \text{[Equation 1]}$$

D may be an initial distance that is a distance between the electronic apparatus 400 and the external electronic apparatus 450. $V_S$ may be a transmission speed of the ultrasound signal 428. $V_S$ may be a transmission speed of the ultrasound signal 428 in air. $V_S$ may vary according to a medium, and thus may be, for example, 340 m/s (since the medium is air). The ultrasound reception time $R_S$ 430 is information obtained by the controller 330 that is in the application 403, and the BLE reception time $R_B$ 414 is information obtained by the controller 330 that is in the application 403. Also, the difference value Δt 418 between the ultrasound transmission time $T_S$ and the BLE transmission time $T_B$ is obtained by the controller 330 that is in the application 403.

The distance D may refer to a shortest distance or a linear distance between the electronic apparatus 400 and the external electronic apparatus 450.

Also, in order to increase the accuracy of the distance D in [Equation 1], the distance D may be calculated in consideration of a time Δd taken for the ultrasound signal 428 to be detected by the microphone (not shown) of the electronic apparatus 400 and to be recognized by the application 403.

In detail, the distance D may be calculated according to [Equation 2].

$$D \approx V_S \times (\Delta d + R_S - R_B - \Delta t) \quad \text{[Equation 2]}$$

As described with reference to FIG. 4, when a distance between electronic apparatuses is measured by using both an ultrasound signal and a BLE signal, a deviation occurring due to RF characteristics in a wireless signal that is an RF signal may be minimized and the distance may be accurately estimated.

Accordingly, the electronic apparatus 400 according to an embodiment may accurately calculate or estimate an initial distance that is the distance D between the electronic apparatus 400 and the external electronic apparatus 450 by using the received ultrasound signal and the BLE signal.

FIG. 5 is a flowchart of an operation of measuring an initial distance, according to an embodiment.

Referring to FIGS. 4 and 5, an operation 500 of measuring an initial distance according to an embodiment includes operations S510, S520, and S530. First, in operation S510, the electronic apparatus 400 receives a wireless signal (e.g., the BLE signal 413) and a sound wave signal (e.g., the ultrasound signal 428) from the external electronic apparatus 450.

Next, in operation S520, information about a transmission time of the wireless signal (e.g., the BLE signal 413) and information about a transmission time of the sound wave signal (e.g., the ultrasound signal 428) may be received from the external electronic apparatus 450. Referring to FIG. 4, the electronic apparatus 400 may obtain information about the ultrasound transmission time $T_S$ and the BLE transmission time $T_B$. Alternatively, the electronic apparatus 400 may obtain the difference value $\Delta t$ 418 between the ultrasound transmission time $T_S$ and the BLE transmission time $T_B$.

Next, in operation S530, the electronic apparatus 400 may measure an initial distance, based on the transmission time and a reception time of each of the wireless signal (e.g., the BLE signal 413) and the sound wave signal (e.g., the ultrasound signal 428). In detail, the initial distance may be measured by using [Equation 1] or [Equation 2].

Also, the operation 500 of FIG. 5 may be performed by the controller 330.

Next, a propagation constant may be measured based on the initial distance according to an embodiment. An operation of measuring a propagation constant will now be described with reference to FIG. 6.

FIG. 6 is a flowchart of an operation of setting a propagation constant, according to an embodiment.

The controller 330 may measure a propagation constant based on an initial distance, a transmission power value of a wireless signal, and a value corresponding to a received signal strength of the wireless signal. The propagation constant is a value describing properties of a medium through which a signal passes. That is, the propagation constant describes properties of a medium through which at least one of a sound wave signal and the wireless signal passes.

In an embodiment, the propagation constant may vary according to the medium through which at least one of the wireless signal and the sound wave signal transmitted between the external electronic apparatus 450 and the electronic apparatus 400 passes.

Accordingly, the propagation constant may have a different value according to properties of a material of the external electronic apparatus 450, for example, a material of a back cover of the external electronic apparatus 450. In detail, the propagation constant may vary according to properties of an antenna for transmitting the wireless signal from the external electronic apparatus 450, the mounting of a module, an exterior material, and an installation position.

Also, the propagation constant may vary according to properties of a material of the electronic apparatus 400, for example, positions of a speaker and a wireless communication module, the mounting of a module, and an exterior material, and an installation position.

The propagation constant may be calculated by using [Equation 3].

[Equation 3]

$$N = \frac{(T_X\text{Power} - RSSI)}{10} \times \log(D)$$

In [Equation 3], N denotes the propagation constant. TxPower denotes transmission power of the wireless signal, and RSSI denotes an RSSI value of the wireless signal. D denotes a distance between the electronic apparatus 400 and the external electronic apparatus 450. TxPower is a value that may vary according to a type of the transmitted wireless signal, and a product specification and a product model of the external electronic apparatus 450. For example, a fixed value of 3 dBm is used as transmission power of a BLE signal in a TV product of a predetermined model. That is, TxPower may be a known value according to what is the external electronic apparatus 450. Also, TxPower may be continuously updated through communication between two apparatuses according to the external electronic apparatus 450.

RSSI is a value that may be obtained by the electronic apparatus 400 that is a receiving end. In detail, the electronic apparatus 400 may obtain an RSSI value by measuring power of the received BLE signal.

D in [Equation 3] denotes a distance between the external electronic apparatus 450 and the electronic apparatus 400. In order to calculate the propagation constant N, an initial distance obtained by using [Equation 1] or [Equation 2] may be input to D in [Equation 3].

Accordingly, in [Equation 3], the propagation constant N may be calculated by inputting the initial distance to D, a value corresponding to a value obtained by measuring the power of the received BLE signal to RSSI, and a known value (that is set or known according to what is the external electronic apparatus 450) to TxPower.

Once the propagation constant N is obtained, even when the distance between the external electronic apparatus 450 and the electronic apparatus 400 is changed to a first distance, the first distance between the external electronic apparatus 450 and the electronic apparatus 400 may be easily measured by using the propagation constant N. An operation of measuring the first distance will now be described in detail with reference to FIG. 7.

Figure 7:
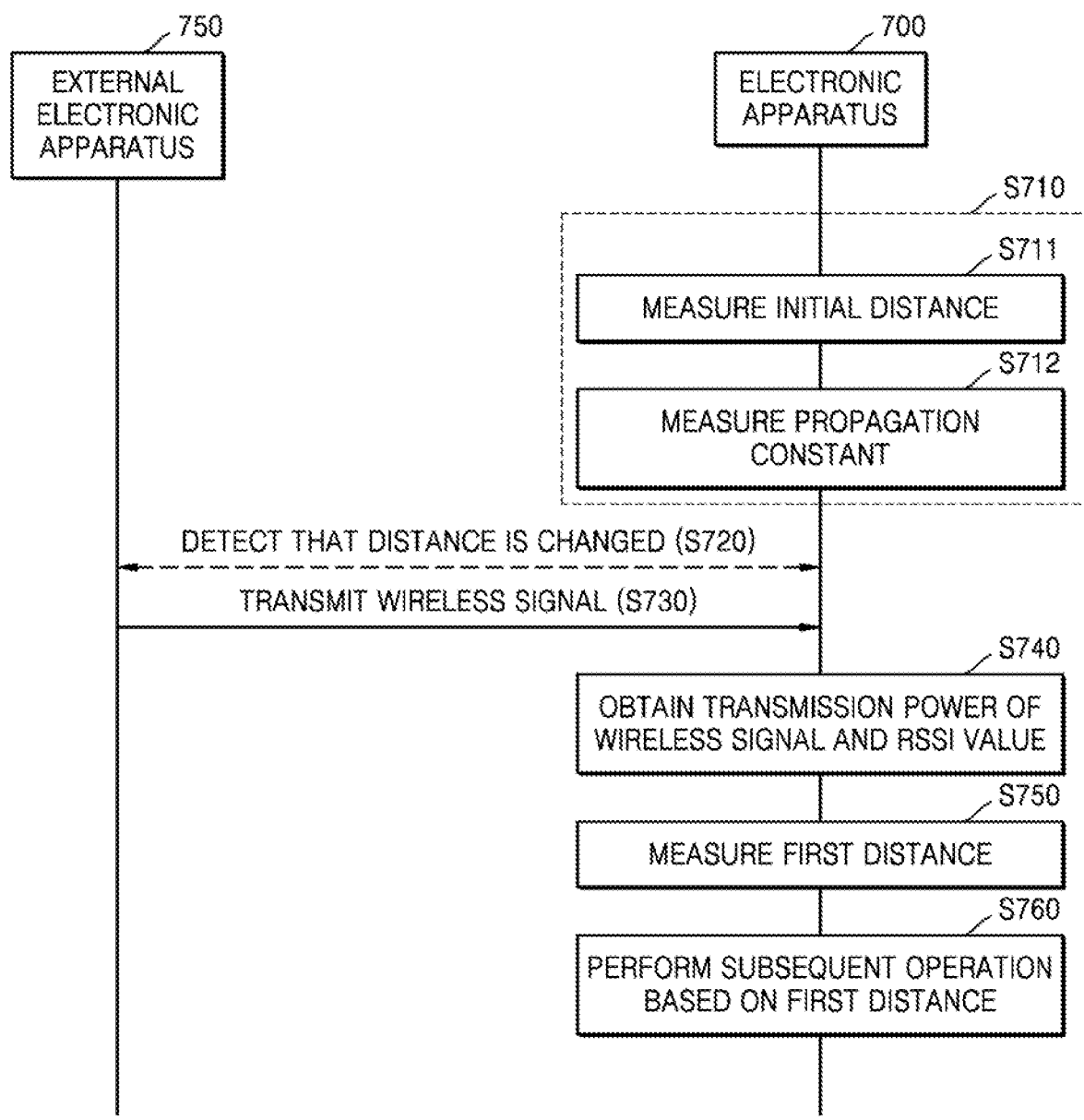
FIG. 7 is a diagram for describing an operation of measuring a distance between electronic apparatuses, according to an embodiment.

FIG. 7 is a diagram for describing an operation of measuring a distance between electronic apparatuses, according to an embodiment.

Referring to FIG. 7, an operation of easily measuring a distance between two electronic apparatuses by using a propagation constant is illustrated. In detail, a first distance that is a distance between two electronic apparatuses, e.g., an electronic apparatus 700 and an external electronic apparatus 750 according to an embodiment, may be measured.

In FIG. 7, since the electronic apparatus 700 may correspond to any of the electronic apparatuses 200, 300, and 400 of FIGS. 2, 3, and 4, the same description as that made with reference to FIGS. 2, 3, and 4 will not be repeatedly given. Also, since the external electronic apparatus 750 of FIG. 7 may correspond to any of the external electronic apparatuses 250 and 450 of FIGS. 2 and 4, the same description as that made with reference to FIGS. 2 and 4 will not be repeatedly given.

When a distance between the external electronic apparatus 750 and the electronic apparatus 700 is changed to a first distance, the controller 330 measures the first distance based on a propagation constant, a transmission power value of a wireless signal, and a value corresponding to a received signal strength of the wireless signal.

Referring to FIG. 7, the electronic apparatus 700 measures an initial distance in operation S711, and measures a propagation constant based on the initial distance in operation S712. When the measuring of the propagation constant based on the initial distance is completed, the electronic apparatus 700 may store the propagation constant between the electronic apparatus 700 and the external electronic apparatus 750 in the storage 360. Alternatively, the controller 330 of the electronic apparatus 700 may set and store the obtained propagation constant in an internal storage (not shown).

Referring to FIG. 7, when the distance between the electronic apparatus 700 and the external electronic apparatus 750 is changed to a first distance in operation S720, the controller 330 of the electronic apparatus 700 may measure the first distance based on the propagation constant.

In detail, the electronic apparatus 700 may measure the first distance based on the propagation constant, the transmission power value of the wireless signal, and the value corresponding to the received signal strength of the wireless signal.

Referring to FIG. 7, when the distance between the electronic apparatus 700 and the external electronic apparatus 750 is changed to the first distance in operation S720, the electronic apparatus 700 may receive the wireless signal from the external electronic apparatus 750 in operation S730. In detail, the external electronic apparatus 750 may transmit a BLE signal to the electronic apparatus 700 in operation S730.

Next, in operation S740, the electronic apparatus 700 may obtain transmission power of the wireless signal and an RSSI value of the wireless signal received in operation S730. The transmission power of the wireless signal is a value corresponding to TxPower of [Equation 3]. Accordingly, the transmission power of the wireless signal is a value that may vary according to a type of the transmitted wireless signal and a product specification and a product model of the external electronic apparatus 450. For example, a fixed value of 3 dBm is used as transmission power of the BLE signal in a TV product of a predetermined model. Accordingly, TxPower that is the transmission power of the wireless signal may be a known value according to what is the external electronic apparatus 750.

Also, the RSSI value of the wireless signal may be obtained by the electronic apparatus 700 that is a receiving end.

In detail, the first distance may be calculated by using [Equation 4].

Also, [Equation 4] may be obtained by modifying [Equation 3].

$$D = 10^{\left(\frac{(T_X Power - RSSI)}{(10 \times N)}\right)}$$ [Equation 4]

D that is the distance between the electronic apparatus 700 and the external electronic apparatus 750 may become the first distance. Definitions of variables in [Equation 4] are the same as those in [Equation 3], and thus a detailed explanation thereof will not be given.

That is, once the propagation constant is obtained, even when the distance between the electronic apparatus 700 and the external electronic apparatus 750 is changed to the first distance, the first distance may be easily measured by obtaining only the RSSI value of the wireless signal at the changed distance.

An RSSI of the wireless signal transmitted at the changed distance, e.g., the BLE signal, may be measured by the electronic apparatus 700 that is a receiving end.

Accordingly, in an embodiment, once the propagation constant N is obtained, even when the distance between the electronic apparatus 700 and the external electronic apparatus 750 is changed, the changed distance may be rapidly and accurately measured by measuring only the RSSI of the wireless signal transmitted at the changed distance, e.g., the BLE signal. That is, the distance between the electronic apparatus 700 and the external electronic apparatus 750 may be updated by updating only the RSSI of the received wireless signal.

Also, the electronic apparatus 700 may perform a subsequent operation based on the first distance measured in operation S750. For example, the electronic apparatus 700 may perform an operation of maintaining wireless communication when the first distance that is the measured distance is within a limit. Alternatively, when the first distance between the electronic apparatus 700 and the external electronic apparatus 750 is equal to or less than a predetermined distance, the electronic apparatus 700 may perform an operation such as screen mirroring.

As described above, an electronic apparatus according to an embodiment may accurately estimate or measure a distance between an electronic apparatus and an external electronic apparatus by measuring an initial distance by using both a wireless signal and a sound wave signal. A propagation constant having high accuracy may be obtained by measuring a propagation constant between the electronic apparatus and the external electronic apparatus based on the initial distance obtained by using the wireless signal and the sound wave signal. Even when the distance between the electronic apparatus and the external electronic apparatus is changed later, the changed distance may be easily and accurately measured by re-measuring only an RSSI value by using the propagation constant that is already obtained.

Also, the electronic apparatus and the external electronic apparatus are relative terms and may be interchangeably used according to which apparatus from among a plurality of electronic apparatuses that are operable by being paired is a reference apparatus.

Accordingly, in an embodiment, for example, the external electronic apparatus 450 may be interpreted as the electronic apparatus according to an embodiment. In this case, the electronic apparatus according to an embodiment may perform an operation of transmitting a wireless signal and a sound wave signal, and may perform at least one of an operation of measuring an initial distance, an operation of measuring a propagation constant, and an operation of measuring a first distance.

Figure 8:
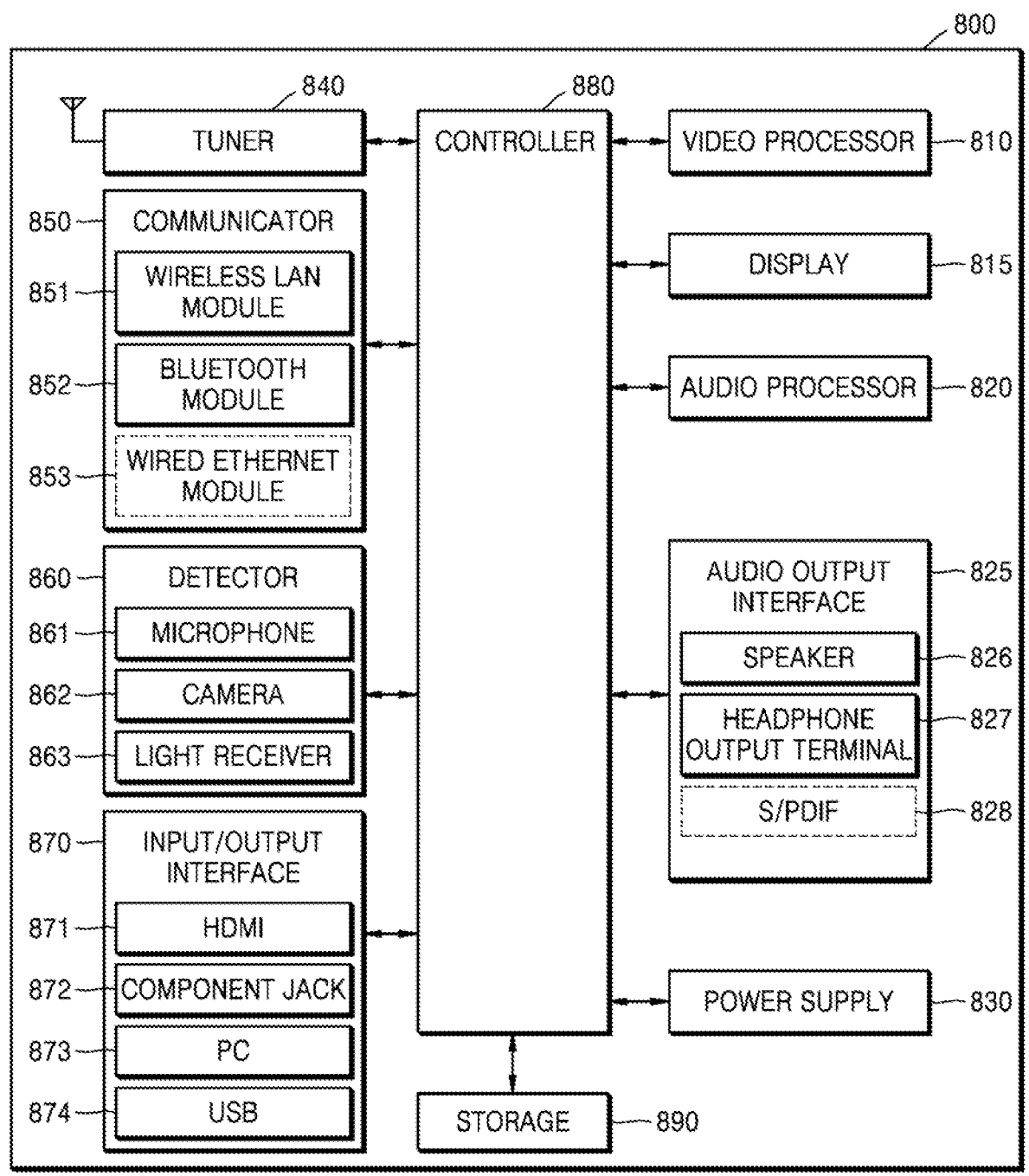
FIG. 8 is a block diagram of a display apparatus according to an embodiment.

FIG. 8 is a block diagram of a display apparatus 800 according to an embodiment.

The display apparatus 800 according to an embodiment may correspond to any of the external electronic apparatuses 250, 450, and 750 of FIGS. 7 through 7. In this case, the display apparatus 800 may be an electronic apparatus of an end that transmits a BLE signal that is a wireless signal. Also, the display apparatus 800 according to an embodiment may correspond to any of the electronic apparatuses 200, 300, 400, and 700 of FIGS. 1 through 7. In this case, the display apparatus 800 may be an electronic apparatus of an end that receives the BLE signal that is the wireless signal. The display apparatus 800 will now be described with reference to the electronic apparatus 300 according to an embodiment.

An electronic apparatus according to an embodiment may be included in a display apparatus. In detail, the electronic apparatus 300 according to an embodiment may be included in the display apparatus 800. In detail, the display apparatus 800 that is an apparatus for visually outputting an image screen such as image content, advertisement and guide information, or a user interface screen to a user may be any of various apparatuses such as a TV or a digital broadcast terminal. Also, the display apparatus 800 may be a fixed apparatus, a movable apparatus, or a portable apparatus.

Referring to FIG. 8, the display apparatus 800 includes a video processor 810, a display 815, an audio processor 820, an audio output interface 825, a power supply 830, a tuner 840, a communicator 850, a detector (not shown), an input/output interface 870, a controller 880, and a storage 890.

The controller 880 may correspond to the controller 330 of the electronic apparatus 300 of FIG. 3. Also, the wireless communicator 305, the Bluetooth module 310, the wireless LAN module 317, the speaker 325, the microphone 320, the display 340, and the storage 360 of FIG. 3 respectively correspond to the communicator 850, a Bluetooth module 852, a wireless LAN module 851, a speaker 826, a microphone 861, the display 815, and the storage 890 of the display apparatus 800 of FIG. 8. Accordingly, when the display apparatus 800 of FIG. 8 is described, the same description as that made for the electronic apparatus 300 will not be repeatedly given.

The video processor 810 performs processing on video data received by the display apparatus 800. The video processor 810 may perform various image processing such as decoding, scaling, noise filtering, frame rate conversion, or resolution conversion on the video data.

The controller 880 may receive a request to record the video data processed by the video processor 810, may encrypt the video data, and may control the encrypted video data to be recorded in a memory device, e.g., a RAM (not shown), included in the storage 890 or the controller 880.

The display 815 displays a video included in a broadcast signal received through the tuner 840 on a screen under the control of the controller 880. Also, the display 815 may display content (e.g., a moving image) input through the communicator 850 or the input/output interface 870.

Also, the display 815 may output an image stored in the storage 890 under the control of the controller 880. Also, the display 815 may display a voice user interface (UI) (e.g., including a voice instruction guide) for performing a voice recognition task corresponding to voice recognition or a motion UI (e.g., including a user motion guide for motion recognition) for performing a motion recognition task corresponding to motion recognition.

The audio processor 820 processes audio data. The audio processor 820 may perform various processing such as decoding, amplification, or noise filtering on the audio data. The audio processor 820 may include a plurality of audio processing modules to process an audio corresponding to a plurality of pieces of content.

The audio output interface 825 outputs an audio included in the broadcast signal received through the tuner 840 under the control of the controller 880. The audio output interface 825 may output an audio (e.g., a voice or a sound) input through the communicator 850 or the input/output interface 870. Also, the audio output interface 825 may output an audio stored in the storage 890 under the control of the controller 880. The audio output interface 825 may output an audio stored in the storage 890 under the control of the controller 880. The audio output interface 825 may include at least one of the speaker 826, a headphone output terminal 827, and a Sony/Philips Digital Interface (S/PDIF) output terminal 828. The audio output interface 825 may include a combination of the speaker 826, the headphone output terminal 827, and the S/PDIF output terminal 828.

In an embodiment, the speaker 826 may output a sound wave signal. In detail, the speaker 826 may output an ultrasound signal.

The power supply 830 supplies power input from an external power supply source to internal elements 810 through 890 of the display apparatus 800 under the control of the controller 880. Also, the power supply 830 may supply power output from one or more batteries (not shown) located in the display apparatus 800 to the internal elements 810 through 890 under the control of the controller 880.

The tuner 840 may tune and select only a frequency of a channel to be received by the display apparatus 800 from among many propagation components by performing amplification, mixing, or resonance on the broadcast signal received by wire or wirelessly. The broadcast signal includes an audio, a video, and additional information (e.g., an electronic program guide (EPG)).

The tuner 840 may receive the broadcast signal in a frequency band corresponding to a channel number (e.g., a cable broadcast channel 506) according to a user input (e.g., a control signal received from an external control device (not shown) (e.g., a remote controller), for example, a channel number input, a channel up-down input, or a channel input on an EPG screen).

The tuner 840 may receive the broadcast signal from any of various sources such as a terrestrial broadcast source, a cable broadcast source, a satellite broadcast source, or an Internet broadcast source. The tuner 840 may receive the broadcast signal from a source such as analog broadcasting or digital broadcasting. The broadcast signal received by the tuner 840 is decoded by using, for example, audio decoding, video decoding, or additional information decoding, and is separated into an audio, a video, and/or additional information. The audio, the video, and/or the additional information may be stored in the storage 890 under the control of the controller 880.

The display apparatus 800 may include one or more tuners 840. According to an embodiment, when the display apparatus 800 includes a plurality of the tuners 840, the display apparatus 800 may output a plurality of broadcast signals to a plurality of windows constituting a multi-window screen provided on the display 815.

The tuner 840 may be integrated into the display apparatus 800 in an all-in-one manner, or may be connected to a separate device (e.g., a set-top box (not shown)) that is electrically connected to the display apparatus 800 or to the input/output interface 870.

The communicator 850 may connect the display apparatus 800 to an external device (e.g., an audio device) under the control of the controller 880. The controller 880 may transmit/receive content to/from the external device that is connected to the controller 880 through the communicator 850, may download an application from the external device, or may perform web browsing. In detail, the communicator 850 may be connected to a network and may receive content from an external device (not shown).

As described above, the communicator 850 may include at least one of a short-range communication module (not shown), a wired communication module (not shown), and a mobile communication module (not shown).

In FIG. 8, the communicator 850 includes any one of a wireless LAN module 851, the Bluetooth module 852, and a wired Ethernet module 853.

Alternatively, the communicator 850 may include a combination of the wireless LAN module 851, the Bluetooth module 852, and the wired Ethernet module 853. Also, the communicator 850 may receive a control signal of a control device (not shown) under the control of the controller 880. The control signal may be, for example, a Bluetooth signal, an RF signal, or a WiFi signal.

In an embodiment, the Bluetooth module 852 may be a BLE module, and may transmit or receive a BLE signal.

The communicator 850 may further include a short-range communication system (e.g., a near-field communication (NFC) system (not shown) or a BLE system (not shown)) other than the Bluetooth module 852.

The detector (not shown) detects a voice of the user, an image of the user, or an interaction of the user.

The microphone 861 receives a voice uttered by the user. The microphone 861 may convert the received voice into an electrical signal and may output the electrical signal to the controller 880. The voice of the user may include, for example, a voice corresponding to a menu or a function of the display apparatus 800. A recommended recognition range of the microphone 861 may be about 4 m between the microphone 861 and a position of the user, and may vary according to a voice tone of the user and an ambient environment (e.g., a speaker sound or an ambient noise).

The microphone 861 may be integrated into or separated from the display apparatus 800. When the microphone 861 is separated from the display apparatus 800, the microphone 861 may be electrically connected to the display apparatus 800 through the communicator 850 or the input/output interface 870.

In an embodiment, the microphone 861 may receive a sound wave signal as well as the voice of the user. In detail, the microphone 861 may receive an ultrasound signal.

It will be understood by one of ordinary skill in the art that the microphone 861 may be omitted according to a performance and a structure of the display apparatus 800.

A camera 862 receives an image (e.g., continuous frames) corresponding to a motion of the user including a gesture in a recognition range. For example, the recognition range of the camera 862 may be about 0.1 m to about 5 m between the camera 862 and a position of the user. The motion of the user may include a motion of a body part or a region of the user such as the face, facial expression, hand, fist, or finger of the user. The camera 862 may convert the received image into an electrical signal and may output the electrical signal to the controller 880 under the control of the controller 880.

The controller 880 may select a menu displayed on the display apparatus 800 by using a result of motion recognition or may perform control corresponding to the result of motion recognition. For example, the controller 880 may adjust a channel or a volume or move a cursor.

The camera 862 may include a lens (not shown) and an image sensor (not shown). The camera 862 may support optical zooming or digital zooming by using a plurality of lenses and image processing. A recognition range of the camera 862 may be set to vary according to an angle of a camera and an ambient environment condition. When the camera 862 includes a plurality of cameras, the camera 862 may receive three-dimensional (3D) still images or 3D moving images by using the plurality of cameras.

The camera 862 may be integrated into or separated from the display apparatus 800. When the camera 862 is separated from the display apparatus 800, an additional device (not shown) including the camera 862 may be electrically connected to the display apparatus 800 through the communicator 850 or the input/output interface 870.

It will be understood by one of ordinary skill in the art that the camera 862 may be omitted according to a performance and a structure of the display apparatus 800.

A light receiver 863 receives an optical signal (including a control signal) that is received from an external control device (not shown) through a light window (not shown) or the like in a bezel of the display 815. The light receiver 863 may receive an optical signal corresponding to a user input (e.g., a touch, a push, a touch gesture, a voice, or a motion) from the control device. The control signal may be extracted from the received optical signal under the control of the controller 880.

For example, the light receiver 863 may receive a signal corresponding to a pointing position of the control device and may transmit the signal to the controller 880. For example, a user interface screen for receiving data or a command from the user through the display 815 may be output, and when the user is to input data or a command to the display apparatus 800 through the control device, when the user moves the control device in a state of contacting his finger on a touchpad (not shown) provided on the control device, the light receiver 863 may receive a signal corresponding to the movement of the control device and may transmit the signal to the controller 880. Also, the light receiver 863 may receive a signal indicating that a specific button provided in the control device is pressed and may transmit the signal to the controller 880. For example, when the user presses the touchpad that is provided as a button in the control device by using his/her finger, the light receiver 863 may receive a signal indicating that the touchpad is pressed and may transmit the signal to the controller 880. For example, the signal indicating that the touchpad is pressed may be used as a signal for selecting one of items.

The input/output interface 870 receives a video (e.g., a moving image), an audio (e.g., a voice or music), and additional information (e.g., an EPG) from the outside of the display apparatus 800 under the control of the controller 880. The input/output interface 870 may include at least one of a high-definition multimedia interface (HDMI) port 871, a component jack 872, a PC port 873, and a universal serial bus (USB) port 874. The input/output interface 870 may include a combination of the HDMI port 871, the component jack 872, the PC port 873, and the USB port 874.

It will be understood by one of ordinary skill in the art that the input/output interface 870 may be configured and operate in various ways according to an embodiment.

The controller 880 controls an overall operation of the display apparatus 800 and signal transmission/reception between the internal elements 810 through 890 of the display apparatus 800, and processes data. When a user input occurs or satisfies a condition that is previously set and stored, the controller 880 may execute an operating system (OS) and various applications that are stored in the storage 890.

The controller 880 may include a RAM (not shown) for storing a signal or data input from the outside of the display apparatus 800 or used as a storage corresponding to various tasks performed by the display apparatus 800, a ROM (not shown) for storing a control program for controlling the display apparatus 800, and a processor (not shown).

The processor may include a graphics processing unit (GPU) (not shown) for performing graphics processing on a video. The processor may be provided as a system-on-chip (SoC) in which a core (not shown) is combined with a GPU (not shown). The processor may include a single-core, a dual-core, a triple-core, a quad-core, and a multiple core thereof.

Also, the processor may include a plurality of processors. For example, the processor may be a main processor (not shown) and a sub-processor (not shown) operating in a sleep mode.

A graphics processor (not shown) generates a screen including various objects such as an icon, an image, and text by using a calculator (not shown) and a renderer (not shown). The calculator calculates an attribute value such as a coordinate value, a shape, a size, or a color of each object to be displayed according to a layout of a screen by using a user interaction detected by the detector. The renderer generates a screen of various layouts including an object based on the calculated attribute value. The screen generated by the renderer is displayed in a display area of the display 815.

Figure 9:
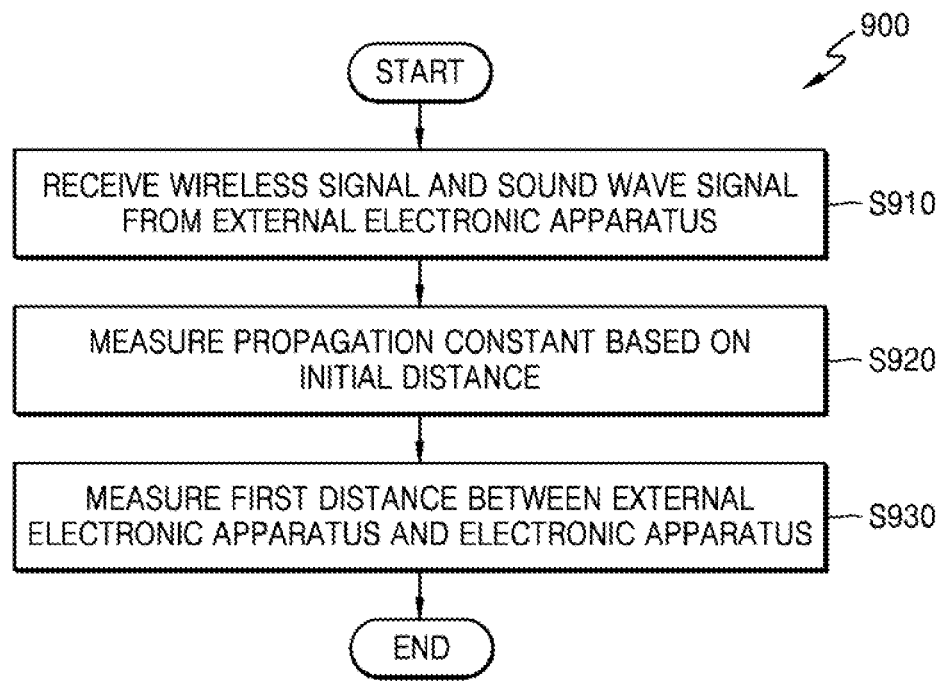
FIG. 9 is a flowchart of a method of measuring a distance between electronic apparatuses, according to an embodiment.

FIG. 9 is a flowchart of a method 900 of measuring a distance between electronic apparatuses, according to an embodiment.

The method 900 according to an embodiment is the same as an operation performed by any of the electronic apparatuses 100, 200, 300, 400, and 700 of FIGS. 1 through 7. Accordingly, when the method 900 is described, the same description as that made with reference to FIGS. 1 through 7 will not be repeatedly given. Also, the method 900 will now be described with reference to the electronic apparatus 200 of FIG. 2.

The method 900 according to an embodiment is a method of measuring or estimating a distance between a plurality of electronic apparatuses. For example, the method 900 is a method of measuring or estimating a distance between the electronic apparatus 200 and the external electronic apparatus 250 located adjacent to the electronic apparatus 200.

Referring to FIG. 9, in operation S910, the method 900 receives a wireless signal and a sound wave signal from an external electronic apparatus. Operation S910 may be performed by the wireless communicator 210 and the sound wave receiver 220 under the control of the controller 230. The wireless signal may be a BLE signal, and the sound wave signal may be an ultrasound signal. Also, operation S910 has been described in detail with reference to FIG. 4.

In operation S920, a propagation constant of the external electronic apparatus 250 is measured based on an initial distance between the external electronic apparatus 250 and the electronic apparatus 200 by using the wireless signal and the sound wave signal obtained in operation S910. The propagation constant corresponds to properties of a medium through which the wireless signal between the external electronic apparatus 250 and the electronic apparatus 200 passes. An operation of measuring the propagation constant may be performed by the controller 230. Also, operation S920 has been described in detail with reference to FIGS. 5 and 6.

In operation S930, a distance between the external electronic apparatus 250 and the electronic apparatus 200 is changed to a first distance, the first distance is measured based on the propagation constant. An operation of measuring the first distance may be performed by the controller 230. Also, operation S930 has been described in detail with reference to FIG. 7.

The one or more embodiments of the present disclosure may be embodied as a recording medium, e.g., a program module to be executed in computers, which include computer-executable instructions. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, a program module, other data of a modulated data signal, or another transmission mechanism, and an example thereof includes an arbitrary information transmission medium. Also, some embodiments may be implemented as computer programs or computer program products including instructions executable by computers such as computer programs executed by computers.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail.

The invention claimed is:

1. An electronic apparatus connectable to an external electronic apparatus, the electronic apparatus comprising:
   a wireless communicator configured to receive a wireless signal from the external electronic apparatus;
   a sound wave receiver configured to receive a sound wave signal from the external electronic apparatus; and
   a controller configured to;
   obtain an initial distance between the external electronic apparatus and the electronic apparatus by using the sound wave signal and the wireless signal which is a different type signal from the sound wave signal,
   identify a propagation constant, which is associated with the external electronic apparatus, between the external electronic apparatus and the electronic apparatus based on the initial distance, a transmission power value of the wireless signal, and a value corresponding to a received signal strength of the wireless signal, and
   after the propagation constant is identified, in response to a request for obtaining a distance between the external electronic apparatus and the electronic apparatus being received, obtain the distance between the external electronic apparatus and the electronic apparatus based on the propagation constant which is associated with the external electronic apparatus.

2. The electronic apparatus of claim 1, wherein the controller is further configured to, when the distance between the external electronic apparatus and the electronic apparatus is changed to a first distance, obtain the first distance based on the propagation constant, the transmission power value of the wireless signal, and the value corresponding to the received signal strength of the wireless signal.

3. The electronic apparatus of claim 2, wherein the wireless signal is a Bluetooth low energy (BLE) signal,
the sound wave signal is an ultrasound signal, and
the value corresponding to the received signal strength is a received signal strength indicator (RSSI) of the BLE signal.

4. The electronic apparatus of claim 1, further comprising a display configured to output a user interface screen displaying at least one of information about the obtained distance and information about the external electronic apparatus spaced apart by the obtained distance from the electronic apparatus.

5. The electronic apparatus of claim 1, wherein the controller is further configured to obtain the initial distance based on a transmission time and a reception time of each of the wireless signal and the sound wave signal.

6. The electronic apparatus of claim 5, wherein the wireless communicator is further configured to receive information about the transmission time of each of the wireless signal and the sound wave signal, from the external electronic apparatus, and
the controller is further configured to obtain the initial distance, based on the received information about the transmission time and the reception time of each of the wireless signal and the sound wave signal.

7. The electronic apparatus of claim 1, wherein the wireless communicator comprises a BLE communication module configured to receive the wireless signal that is a BLE signal, and
the sound wave receiver comprises a microphone configured to receive the wireless signal that is an ultrasound signal.

8. An electronic apparatus connectable to an external electronic apparatus, the electronic apparatus comprising:
a sound wave transmitter configured to transmit a sound wave signal to the external electronic apparatus;
a wireless communicator configured to transmit a wireless signal to the external electronic apparatus and receive information about a reception time of the wireless signal and a reception time of the sound wave signal from the external electronic apparatus; and
a controller configured to:
obtain an initial distance between the external electronic apparatus and the electronic apparatus by using the sound wave signal and the wireless signal which is a different type signal from the sound wave signal,
identify a propagation constant, which is associated with the external electronic apparatus, between the external electronic apparatus and the electronic apparatus based on the initial distance, a transmission power value of the wireless signal, and a value corresponding to a received signal strength of the wireless signal, and
after the propagation constant is identified, in response to a request for obtaining a distance between the external electronic apparatus and the electronic apparatus being received, obtain the distance between the external electronic apparatus and the electronic apparatus based on the propagation constant which is associated with the external electronic apparatus.

9. The electronic apparatus of claim 8, wherein the controller is further configured to obtain the initial distance based on a transmission time and the reception time of each of the wireless signal and the sound wave signal, which are received from the external electronic apparatus..

10. A method of measuring a distance, the method comprising:
receiving a wireless signal and a sound wave signal from an external electronic apparatus;
obtaining an initial distance between the external electronic apparatus and the electronic apparatus by using the sound wave signal and the wireless signal which is a different type signal from the sound wave signal;
identifying a propagation constant, which is associated with the external electronic apparatus, between the external electronic apparatus and an electronic apparatus based on the initial distance, a transmission power value of the wireless signal, and a value corresponding to a received signal strength of the wireless signal; and
after the propagation constant is identified, in response to a request for obtaining a distance between the external electronic apparatus and the electronic apparatus being received, obtaining the distance between the external electronic apparatus and the electronic apparatus based on the propagation constant which is associated with the external electronic apparatus.

11. The method of claim 10, wherein the obtaining of the distance between the external electronic apparatus and the electronic apparatus comprises,
obtaining the distance between the external electronic apparatus and the electronic apparatus based on the propagation constant, the transmission power value of the wireless signal, and a-the value corresponding to the received signal strength of the wireless signal.

12. The method of claim 10, further comprising outputting a user interface screen displaying at least one of information about the obtained distance and information about the external electronic apparatus spaced apart by the obtained distance from the electronic apparatus.

13. A non-transitory recording medium having embodied thereon a program comprising computer-executable instructions for executing a method comprising:
obtaining an initial distance between an external electronic apparatus and the electronic apparatus by using a sound wave signal and a wireless signal which is a different type signal from the sound wave signal;
identifying a propagation constant, which is associated with the external electronic apparatus, between the external electronic apparatus and an electronic apparatus based on the initial distance, a transmission power value of the wireless signal, and a value corresponding to a received signal strength of the wireless signal; and
after the propagation constant is identified, in response to a request for obtaining a distance between the external electronic apparatus and the electronic apparatus being received, obtaining the distance between the external electronic apparatus and the electronic apparatus based on the propagation constant which is associated with the external electronic apparatus.

\* \* \* \* \*